July 21, 1959     T. S. HAYHURST     2,895,342
GEARING

Filed July 29, 1955     2 Sheets-Sheet 1

INVENTOR.
THOMAS S. HAYHURST
BY
J. L. Whittaker
ATTORNEY

INVENTOR.
Thomas S. Hayhurst
BY
ATTORNEY

United States Patent Office 2,895,342
Patented July 21, 1959

2,895,342

GEARING

Thomas S. Hayhurst, Moorestown, N.J., assignor, by mesne assignments, to the United States of America as represented by the Secretary of the Army Application July 29, 1955, Serial No. 525,234

9 Claims. (Cl. 74—409)

The present invention relates in general to gearing and in particular to an improved gearing arrangement wherein backlash is reduced to a minimum. The gearing of the invention is particularly useful in applications wherein high torque is required to be transmitted in either direction without backlash, as in antenna drive systems, heavy machinery systems, and, in general, in applications where the characteristics of scissors gears and the like are required but their bulk and inefficiency prohibit their use.

The gearing of the invention includes a pair of first gears spaced apart and mounted to turn about parallel axes of fixed spacing. These gears are engaged with a third gear which is mounted to turn about an axis parallel to and fixed with respect to the parallel axes. A fourth gear is mounted to turn about a movable axis parallel to the parallel axes. The fourth gear is urged in the direction of the third gear and into engagement with the pair of first gears. The urging force is substantially greater than the tangential pressure exerted by the gear which acts as the driver when the latter drives in at least one direction. Any one of the gears may comprise the driver gear; any other gear may comprise the driven gear, that is, the one connected to the load.

In operation, when the fourth gear is initially urged into engagement with the first gears it causes one of said first gears to rotate clockwise and the other to rotate counter-clockwise. The leading edges of the teeth of one of the first gears engage the lagging edges of the teeth of the third gear; the leading edges of teeth of the other first gear engage the leading edges of the teeth of the third gear. "Leading" and "lagging" as used herein are taken with reference to the actual direction of rotation of the first gears and a given direction of rotation of the third gear. In one form of the invention the urging force is applied during only one direction of rotation of the driven gear and in another form of the invention the urging force is applied during both directions of rotations of the driven gear. In both cases, however, regardless of the speed or direction of rotation of the driven gear, the gears are always maintained in the tight, backlash-free engagement described.

The invention will be described in greater detail by reference to the following description taken in connection with the accompanying drawing in which.

Throughout the drawing like reference numerals refer to like elements.

Figure 1:
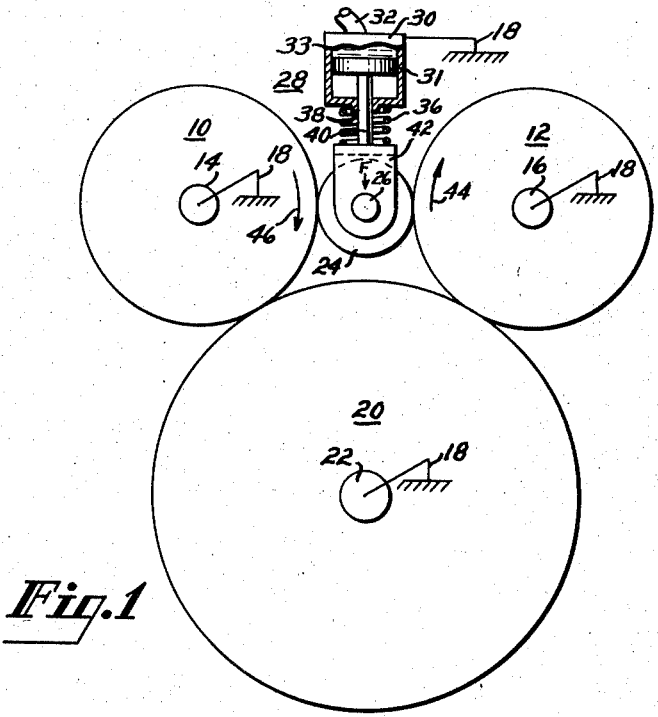
Figure 1 is a plan diagramatic view of the gear train of the invention.
Figure 2:
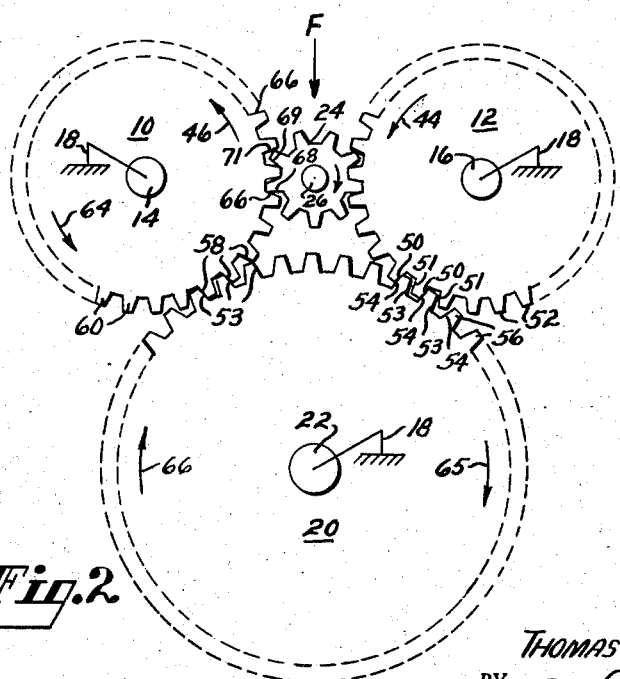
Figure 2 is a more detailed plan view of a portion of the arrangement shown in Figure 1.

Referring now to Figs. 1 and 2, gears 10, 12 are mounted to turn about parallel axles 14, 16 which are spaced a fixed distance from one another. Axles 14 and 16 are mounted on a fixed support indicated schematically by the symbol 18. For the sake of drawing simplicity, the gear teeth are omitted from Fig. 1; however, they are shown in part in Fig. 2.

Gears 10 and 12 are in mesh with gear 20. The latter is mounted to turn on axle 22 which is a fixed distance from and parallel to parallel axles 14 and 16. As in the case of gears 10 and 12, axle 22 is fixed with respect to support 18. Gear 24 is mounted to turn about axle 26 which is parallel to parallel axes 14, 16 and movable with respect thereto. Axle 24 is constantly urged toward the centre of the gear train and into engagement with gears 10, 12 by biasing system 28.

The biasing system includes a cylinder 30 which is fixed with respect to support 18. A piston 31 is located inside of the cylinder and is caused to move by hydraulic fluid 33 forced into inlet pipe 32. Spring 38 maintains a quiescent value of bias on the gear 24. When oil is forced into cylinder 30, piston 31 moves shaft 40 in the direction of the gear train. The shaft is fixed to U-shaped supporting member 42 and thus, movement of the shaft causes corresponding movement of gear 24.

In the arrangement described, gears 10 and 12 are shown as being the same size, however, it is to be understood that they need not necessarily be of the same size. It is also to be understood that any one of the gears 10, 12, 20, 24 may comprise the driver gear and any other of the gears may comprise the driven gear. The gears not acting as driver or driven gears are termed idler gears. In preferred embodiments of the invention, a gear mounted on a fixed axle is selected as the driver gear and another gear also mounted on a fixed axle is selected as the driven gear. One of the reasons is that it is simpler to couple a fixed gear to a driving means or to a load than a "floating" gear.

The operation of the system may, perhaps, be best understood by considering gear 24 as the driver gear and gear 20 as the driven gear. The preferred form of the invention in which one of the gears mounted on a fixed axle acts as the driver gear will be described later in connection with the entire system shown in Fig. 3.

Referring now to Fig. 2, when driver gear 24 is urged by force F into engagement with idler gears 10 and 12, it causes idler gear 12 to move in the counter-clockwise direction, as indicated by arrow 44, and idler gear 10 to move in the clockwise direction, as indicated by arrow 46. The movement of the idler gears is stopped by the teeth of the driven gear 20 since the two idler gears tend to rotate the driven gear in opposite directions. It may be seen from Figure 2 that the leading edges 50 of teeth 52 of idler gear 12 engage in lagging edges 54 of teeth 56 of driven gear 20. The lagging edges 51 of teeth 52 are spaced from the leading edges 53 of teeth 56 due to the tolerances machined into the gears. These spaces are emphasized in the figure. In a similar manner, the leading edges 58 of the teeth 60 of idler gear 10 engage the leading edges 53 of teeth 56 of driven gear 20.

The terms leading and lagging as applied to gear teeth 56 in this specific instance are taken with respect to clockwise rotation of driven gear 20. The same terms as applied to idler gears 10 and 12 are taken with respect to their actual directions of rotation as indicated by arrows 46 and 44, respectively.

Assume now that driver gear 24 is driven in the clockwise direction by a drive means such as a motor (not shown in Fig. 2). This causes both idler gears 10 and 12 to be driven in the counterclockwise direction as indicated by arrow 44 for gear 12 and arrow 64 for gear 10. Driven gear 20 is driven in the clockwise direction as shown by arrow 65. In this mode of operation, idler gear 12 transmits the rotary motion of driver gear 24 to driven gear 20. It will be noted that leading edges 50 of the teeth of idler gear 12 are already in contact with lagging edges 54 of the teeth of driven gear 20 so that there is no backlash, that is, any slack to be taken up between driving gear 24, idler gear 12 and driven gear 20. The driven gear 20, on the other hand, has the leading edges 53 of its teeth in firm engagement with the lagging edges 58 of the teeth of idler gear 10. Therefore, the driven gear 20 transmits the motion of driver gear 24 to idler gear 10 without any backlash whatsoever. By the same token, the leading edge 66 of at least one of the teeth of idler gear 10 is already in firm contact with the lagging edge 68 of a tooth of the driver gear and accordingly there is no backlash between idler gear 10 and driver gear 24.

When it is desired to rotate the driven gear in the counter-clockwise direction driver gear 24 is rotated counter-clockwise. It can now be seen that there is no backlash whatsoever during or after the changeover. The leading edge 68 of a tooth of driver gear 24 is already in firm engagement with the lagging edge 66 of idler gear 10 and accordingly there is no backlash between these two gears. Similarly, when idler gear 10 drives driven gear 20 in a counter-clockwise direction as indicated by arrow 66 the leading edges 58 of the teeth of idler gear 10 are already in firm contact with the lagging edges 62 of driven gear 20. Accordingly, there is no backlash between idler gear 10 and driven gear 20. The same analysis can be carried through for the coupling between driven gear 20 and idler gear 12 and the coupling between idler gear 12 and driving gear 24. During counter-clockwise movement of driving gear 24, idler gear 10 transmits its motion to the driven gear.

The only requirement for the mode of operation above described is that the force F which urges the gear 24 toward the center of the gear train assembly be of somewhat greater magnitude than the tangential pressure resulting from the rotational forces applied to the system. This can best be understood by a specific example. Assume that gear 24 is the driver and that it is rotating clockwise. Idler gear 12 is rotated counter-clockwise thereby and the idler gear, in turn, rotates driver gear 20 clockwise. The tangential forces between driver gear 24 and idler gear 12 tends to cause the driver gear to move in a generally clockwise direction along the peripheral edge of the idler gear. If this tendency were not counteracted, the movable axle 26 of the driver gear would move in a direction opposite to that indicated by arrow F until edge 66 of gear teeth 60 was out of engagement with edge 68 of the gear teeth of gear 24. If this occurred when the direction of rotation of the driver gear was reversed, backlash would be introduced.

The force F applied to gear 24 which constantly urges this gear toward the center of the gear train overcomes the tendency of axle 26 to move in the manner described above. Thus, the system is backlash free.

Figure 3:
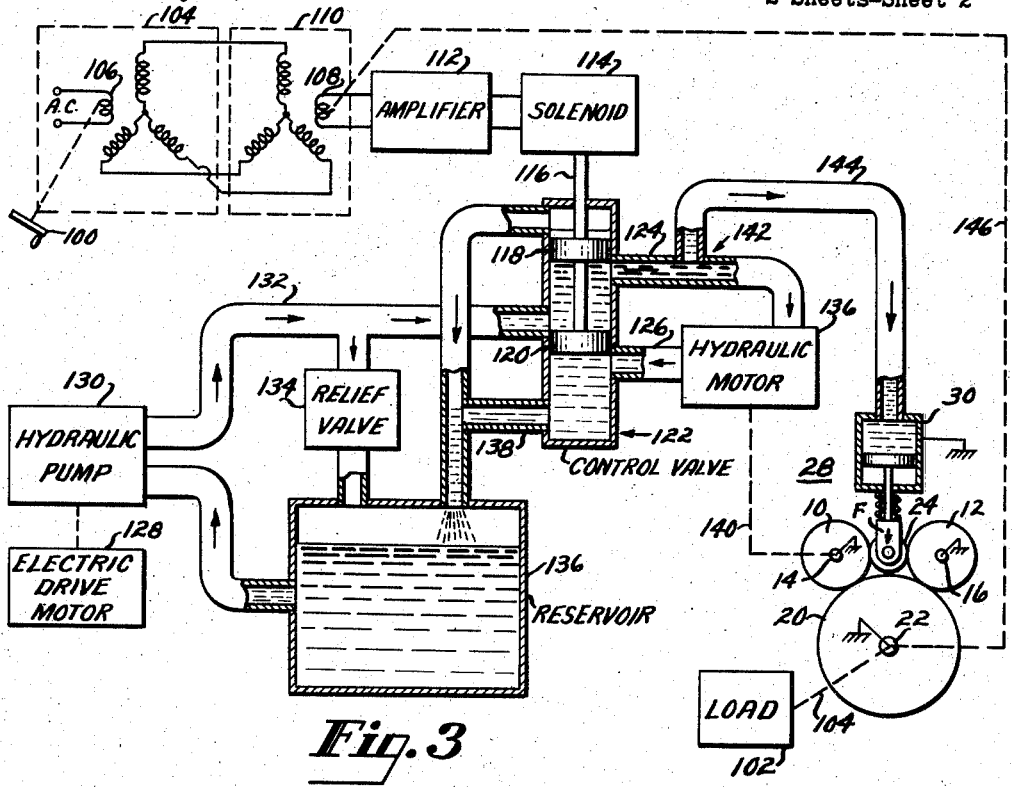
Figure 3 is a schematic diagram of a system embodying the invention.

Figure 3 illustrates the invention embodied in a closed-loop servo arrangement. In an arrangement of this type, the movement of the handwheel 100 is translated into corresponding movement of a load 102, such as, an antenna, gun or the like connected to the output shaft 104 of the driven gear 20. The system includes a synchro transmitter 104 having alternating current at the power frequency applied to its rotor winding 106. When the rotor winding 108 of synchro receiver 110 is out of positional correspondence with rotor 106, an error signal is developed across the former which is applied to amplifier 112. The magnitude and sense of the error signal depend upon the extent and direction of the positional error between rotors 106 and 108. Amplifier 112 amplifies the signal and applies the same to solenoid 114. The solenoid is of a well-known type which is normally biased to some center position. When a signal of one sense is applied to the solenoid, its output shaft 116 (which is coupled to the solenoid armature) moves in one direction and when the signal applied to the solenoid is of an opposite sense, its output shaft 116 moves in the opposition direction. Since servo amplifier 112 and solenoid 114 are of the type well-known to those skilled in the art, they need not be described in further detail.

The output shaft 116 of solenoid 114 is mechanically connected to a pair of spaced pistons 118, 120 of control valve 122. In the unactuated condition of solenoid 114, pistons 118 and 120 block hydraulic fluid lines 124 and 126. In response to an input signal of one sense solenoid 114 moves pistons 118 and 120 toward the position shown in Fig. 3. In the position shown in Fig. 3, fluid lines 124 and 126 are completely open indicating a relatively large magnitude input signal to the solenoid. If the input signal were of smaller magnitude, fluid lines 124 and 126 would be only partially open, the amount of opening in all cases depending upon the magnitude of said input signals.

Referring to the lower left portion of Fig. 3, an electric drive motor 128 constantly drives hydraulic pump 120. The hydraulic pump drives a fixed volume of fluid per unit of time through output line 132. If the pressure in line 132 is excessive, as would be the case if fluid lines 124 and 126 were completely closed or partially closed, all or a portion of the fluid in line 132 would pass through relief valve 134 into reservoir 136. In the position of control valve 122 shown, the hydraulic fluid from pump 130 is forced through line 132 into control valve 122, through line 124 to hydraulic motor 136, back through line 126, through control valve 122, back through line 138, to reservoir 136, and back to hydraulic pump 130. If the sense of the signal applied to solenoid 114 were such that pistons 118 and 120 were moved to positions below fluid lines 124 and 126, respectively, the direction of oil flow through the hydraulic motor would be reversed.

The output of hydraulic motor 136 is applied to driver gear 10 via output shaft 140. The hydraulic motor is of a well known type which provides a mechanical output in response to the passage of hydraulic fluid therethrough. Passage of fluid through the motor in one direction causes shaft 140 to rotate in a clockwise direction and passage of fluid through the hydraulic motor in the opposite direction causes shaft 140 to rotate in a counterclockwise direction. Since hydraulic motors of the type shown in block form in Fig. 3 are well known to those skilled in the art, motor 136 need not be described in further detail.

In the position of control valve 122 shown in Fig. 3, fluid in line 124 is applied through T-connection 142 and fluid line 144 to cylinder 30 of biasing arrangement 28. Thus, there is applied to the biasing arrangement a fluid pressure proportional to the force driving gear 10 for one direction of rotation of gear 10.

The axle 22 of driven gear 20 is mechanically connected to the rotor 128 of sylchro receiver 110 via shaft 146. The purpose of this connection is to move rotor 128 into positional correspondence with rotor 106 when load 102 is in positional correspondence with handwheel 100. When this occurs, the input signal to amplifier 112 is reduced to zero whereby movement of driven gear 20 is stopped.

In the explanation which follows, assume that when control valve 122 is in the position shown in Fig. 3, hydraulic motor 136 rotates driver gear 10 in the counterclockwise direction. When the control valve is in the position shown, a force F is applied by biasing arrangement 28 to gear 24 which is proportional to the force driving gear 10. This force F tends to cause gear 10 to turn in a clockwise direction and gear 12 to turn in a counter-clockwise direction in the manner already explained in detail in connection with Fig. 2. The teeth of gears 10, 24, 12 and 20 are now in tight engagement for counter-clockwise rotation of gear 10 (clockwise rotation of driven gear 20). This can also be seen very clearly from Fig. 2.

When the control valve is thrown to a position such that hydraulic fluid moves through hydraulic motor 136 in a direction opposite to that indicated by the arrows in fluid lines 124 and 126, the hydraulic motor rotates gear 10 in a clockwise direction. However, now fluid line 124 is in direct communication with reservoir 126 and, therefore, there is no pressure in line 124. Thus, the only force maintaining gear 24 in engagement with the gear train is the force exerted by spring 36. This force is fixed and not proportional to the force driving gear 10. It might be thought that this would permit backlash when the direction of rotation of gear 10 changed from counter-clockwise to clockwise. However, if Figure 2 is again referred to, it will be seen that for clockwise rotation of gear 10 the leading edges 58 of teeth 60 are already in tight engagement with the lagging edges 62 of teeth 56. Thus, there is no possibility of backlash.

Figure 4:
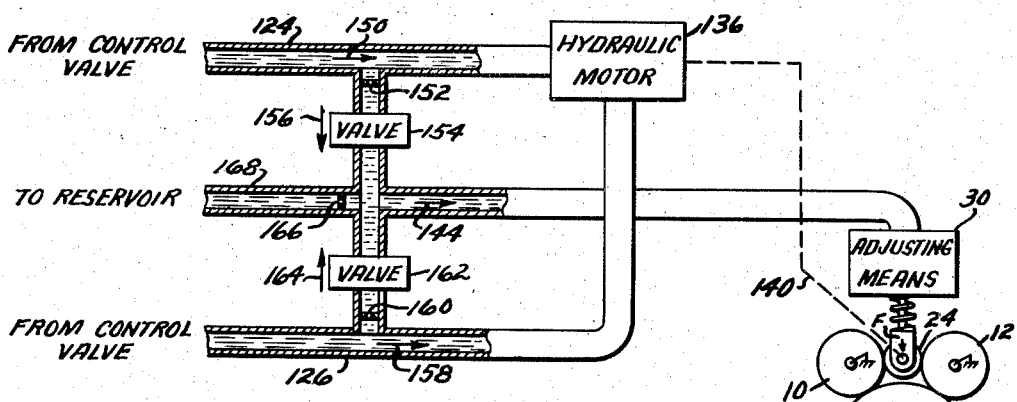
Figure 4 is a schematic drawing of a portion of a modified system embodying the invention.

Figure 4 illustrates a portion of a system similar to the one shown in Figure 3 with the exception that now gear 24 is the driver gear. With a system of this type, it is necessary that force F exceed the tangential pressure resulting from the rotational forces applied to the system for both clockwise and counter-clockwise rotation of the driver gear. This is accomplished according to the invention by a by-pass fluid line arrangement between lines 124 and 126. When the direction of fluid flow in line 124 is as shown by arrow 150, fluid is through orifice 152 and check valve 154 to line 144. The check valve is of a well-known type which permits fluid to flow only in the direction indicated by arrow 156. When the direction of fluid flow in line 126 is as indicated by arrow 158, fluid flows through orifice 160 and check valve 162 into fluid line 144. Check valve 152 also permits fluid flow therethrough in only a single direction, as indicated by arrow 164. When fluid flows in direction 150, output shaft 140 of hydraulic motor 136 rotates in one direction and when fluid flow is as shown by arrow 158, the hydraulic motor rotates output shaft 140 in the opposite direction. Thus, it can be seen that regardless of the direction of rotation of output shaft 140 and, consequently, of driver gear 24, the force F is proportional to the force driving the gear. Any excess pressure which builds up in line 144 is dissipated through orifice 166 and fluid line 168, the latter leading to reservoir 136 (Fig. 3).

In the embodiments of the invention illustrated, the biasing means is shown as consisting mainly of a cylinder, a piston, and hydraulic fluid for moving the piston axially of the cylinder. This is meant to be merely illustrative of the invention and not limiting thereof. Thus, as will be apparent to those skilled in the art, purely mechanical means may be employed for providing the force F. This may include a mechanical coupling between the means for driving the driver gear and the floating gear 24. The mechanical coupling may incorporate a clutch which adjusts the amount of force F applied by the mechanical means to a value which is proportional to the driving force.

What is claimed is:

1. In a gear train, in combination, a pair of first gears spaced apart and mounted to turn on parallel axes of fixed spacing; a third gear mounted to turn about an axis parallel to said parallel axes and fixed with respect thereto, said third gear being engaged with both of said first gears; a fourth gear mounted to turn about an axis parallel to said parallel axes and engageable with both of said first gears; drive means coupled to one of said gears for driving said gear; sensing means coupled to said drive means for sensing the driving force thereof; and means coupled to said sensing means for urging said fourth gear in the direction of said third gear and into engagement with both of said first gears with a force proportional to and greater than the tangential force exerted by said one gear, during at least one direction of rotation of said one gear.

2. In a gear train as set forth in claim 1, said drive means being coupled to one of said pair of first gears.

3. In a gear train as set forth in claim 1, said drive means being coupled to said fourth gear.

4. In a gear train as set forth in claim 1, said third gear being substantially larger in size than said first gears and said fourth gear being substantially smaller in size than said first gears.

5. In a gear train, in combination, a pair of idler gears spaced apart and mounted to turn on parallel axes of fixed spacing; a driven third gear mounted to turn on a third axis which is parallel to and spaced from said parallel axes and fixed with respect thereto, said third gear being in engagement with both of said idler gears; a driver fourth gear mounted to turn on a fourth axis parallel to said pair of parallel axes and movable with respect thereto, said fourth gear being engageable with both of said idler gears; means for sensing the driving force of said fourth gear; and means responsive to said driving force for urging said fourth axis and the gear turnable thereabout in the direction of said idler gears and into engagement therewith with a force proportional to and greater than that of the tangential pressure exerted by said driver fourth gear when the latter drives.

6. In a gear train as set forth in claim 5, said means constantly urging said fourth gear toward said third gear including a coil spring.

7. In a gear train, in combination, a pair of first gears spaced apart and mounted to turn on parallel axes of fixed spacing; a driven third gear mounted to turn on a third axis which is parallel to and spaced from said parallel axes, and fixed with respect thereto, said third gear being in engagement with both of said first gears; a fourth gear mounted to turn on a fourth axis parallel to said pair of parallel axes and movable with respect thereto, said fourth gear being engageable with both of said first gears; drive means mechanically coupled to one of said first gears for rotating the same; means for sensing the driving force applied by said drive means to said one of said first gears and means responsive to said driving force for urging said fourth axis and the gear turnable thereabout in the direction of said third gear and into engagement with both of said first gears with a force proportional to said driving force, for at least one direction of rotation of said first gears.

8. In a gear train, in combination, a pair of idler gears spaced apart and mounted to turn on parallel axes of fixed spacing; a driven third gear mounted to turn on a third axis which is parallel to and spaced from said parallel axes and fixed with respect thereto, said third gear being in engagement with both of said idler gears; a driver fourth gear mounted to turn on a fourth axis parallel to said pair of parallel axes and movable with respect thereto, said fourth gear being engageable with both of said idler gears; and means urging said fourth axis and the gear turnable thereabout in the direction of said idler gears and into engagement therewith with a force proportional to and greater than that of the tangential pressure exerted by said driver fourth gear when the latter drives, said last-named means including a coil spring for maintaining a predetermined amount of urging force applied to said fourth gear and further including hydraulic means for supplementing said predetermined amount of force.

9. In a gear train, in combination, a pair of first gears spaced apart and mounted to turn on parallel axes of fixed spacing; a driven third gear mounted to turn on a third axis which is parallel to and spaced from said parallel axes, and fixed with respect thereto, said third gear being in engagement with both of said first gears; a fourth gear mounted to turn on a fourth axis parallel to said pair of parallel axes and movable with respect thereto, said fourth gear being engageable with both of said first gears; drive means mechanically coupled to one of said first gears for rotating the same; and means including a hydraulic biasing system urging said fourth axis and the gear turnable thereabout in the direction of said third gear and into engagement with both of said first gears with a force proportional to the force driving said one of said first gears, for at least one direction of rotation of said first gears.

References Cited in the file of this patent

UNITED STATES PATENTS

| | | |
|---|---|---|
| 1,947,543 | Kellogg | Feb. 20, 1934 |
| 2,302,575 | Romaine et al. | Nov. 17, 1942 |
| 2,397,777 | Colman | Apr. 2, 1946 |

FOREIGN PATENTS

| | | |
|---|---|---|
| 633,971 | Great Britain | Dec. 30, 1949 |